Sept. 11, 1956 W. J. EATON ET AL 2,762,585
STEERING SYSTEM FOR AIRCRAFT UNDERCARRIAGES
Filed Nov. 27, 1953 5 Sheets-Sheet 1

INVENTOR,
WILLIAM J. EATON
JOSEPH A. PORATH
BY
T. H. Murray
AGENT

Sept. 11, 1956 W. J. EATON ET AL 2,762,585
STEERING SYSTEM FOR AIRCRAFT UNDERCARRIAGES
Filed Nov. 27, 1953 5 Sheets-Sheet 4

INVENTOR.
WILLIAM J. EATON
JOSEPH A. PORATH
BY
T. H. Murray
AGENT

United States Patent Office 2,762,585
Patented Sept. 11, 1956

2,762,585

STEERING SYSTEM FOR AIRCRAFT UNDERCARRIAGES

William J. Eaton and Joseph A. Porath, South Bend, Ind., assignors to Bendix Aviation Corporation, South Bend, Ind., a corporation of Delaware Application November 27, 1953, Serial No. 394,532

18 Claims. (Cl. 244—50)

The present invention relates to steering systems for swivelling or castering aircraft undercarriages and more particularly to steering systems incorporating a device for arresting or dampening shimmy in a castering wheel.

When an aircraft makes a landing in a cross wind (i. e., a landing in a direction other than with the wind) its longitudinal axis will be at an angle to its direction of forward movement. In order to facilitate landings and take-offs under such cross wind conditions, it has heretofore been common to caster the wheels of certain aircraft undercarriages about vertical pivots so that the forward thrust of the aircraft can be taken by the wheels regardless of the angle at which the aircraft approaches the landing strip. In other words, the wheels are pivoted so that they are capable of automatic and substantially immediate alignment with the direction of forward movement at the instant they strike the ground.

Although castered wheels are in this way very adaptable for cross wind landings and take-offs, their use presents certain problems since (1) they must be steered once the aircraft is on the ground, and (2) they have an undesirable tendency to shimmy or oscillate about their castering axes as a result of passage over rough and uneven terrain. These problems become increasingly difficult where dual wheels are employed in the aircraft undercarriage.

Accordingly, it is an important object of this invention to combine into a single mechanism means for steering a castered wheel and means for arresting shimmy of the wheel.

Another object of the invention lies in the provision of a combination steering and shimmy arresting device which incorporates means for locking a castered wheel against rotation about its castering axis.

A further object of the invention is to provide a suitable fluid motor which is disposed between dual castered wheels for steering the same.

A still further object of the invention is to provide in a shimmy arresting device a two-way valve having a spherical valve element interposed between and seatable on a pair of annular valve seats.

The above and other objects and features of the invention will become apparent from the following description taken in connection with the accompanying drawings which form a part of this specification and in which.

Figure 1:
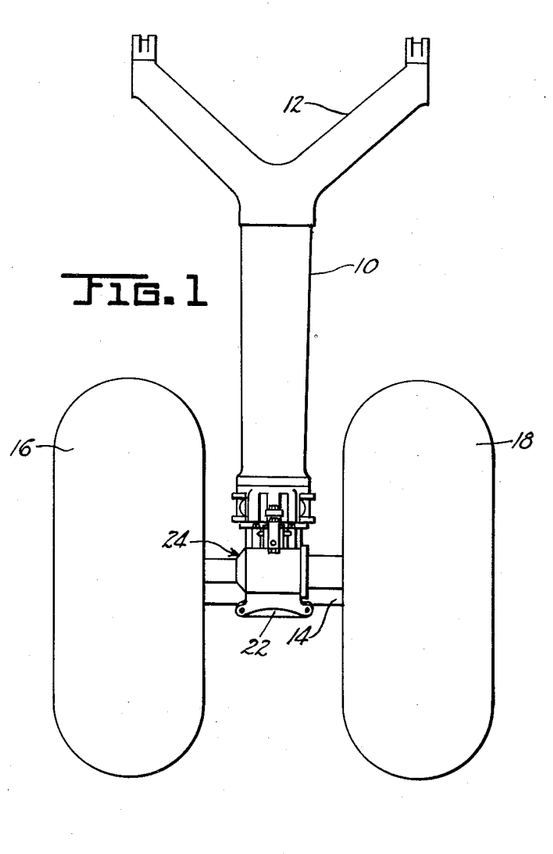
Figure 1 is a rear elevation of an embodiment of the present invention.
Figure 2:
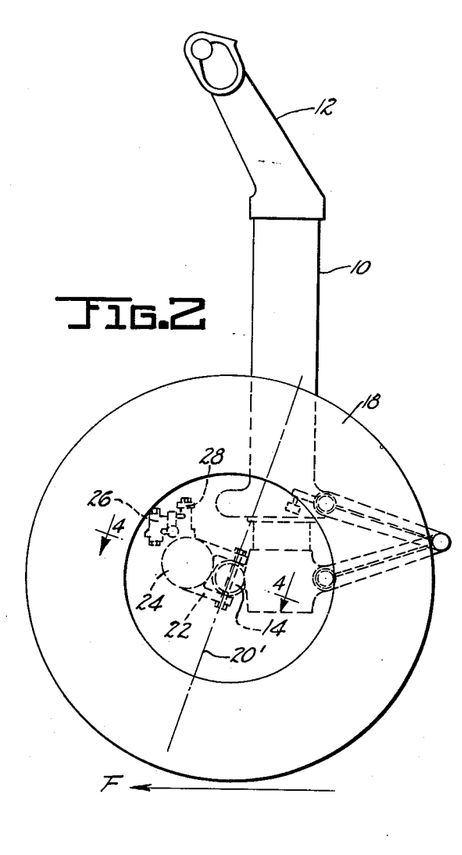
Figure 2 is a side elevation of Figure 1.
Figures 3, 4:
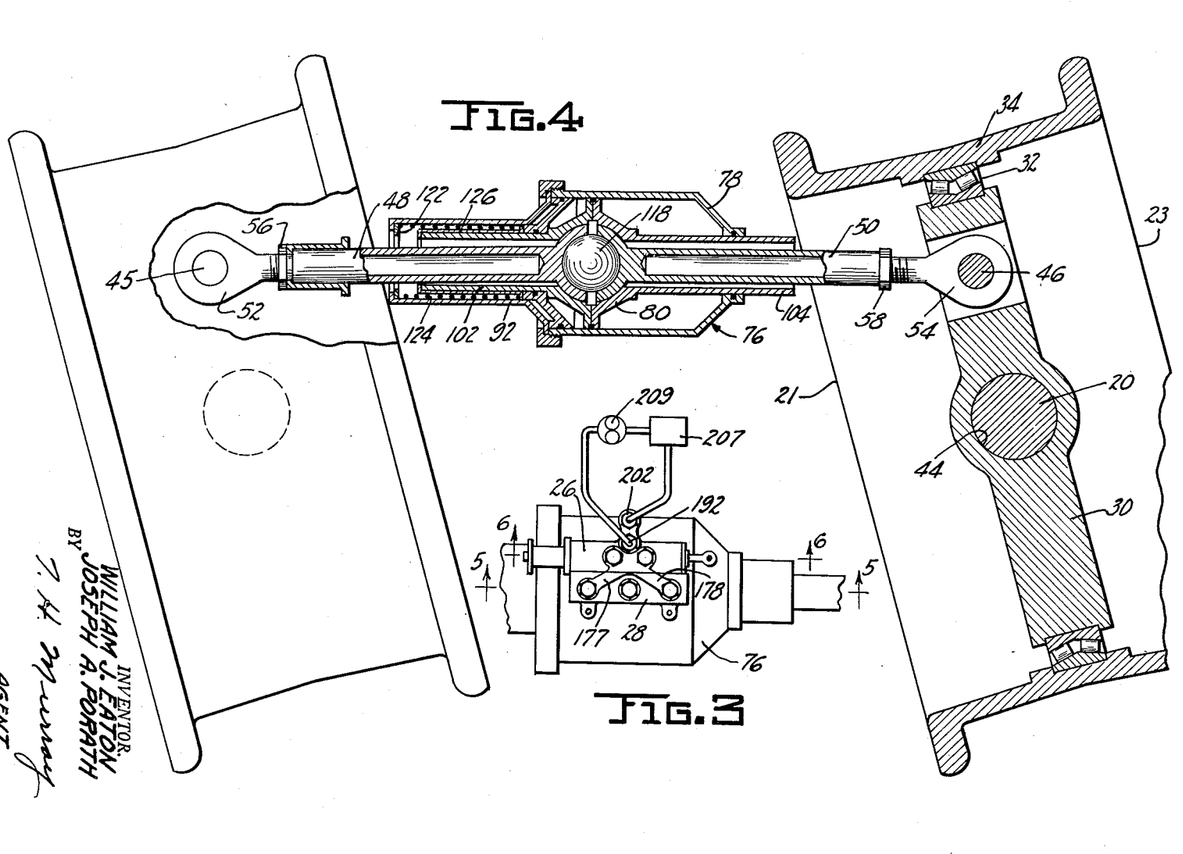
Figure 3 is a schematic top view of the invention showing the position of the steering valve and the shimmy dampening device.
Figure 4 is a sectional view of the fluid motor of the invention taken along line 4—4 of Figure 2 showing its connection to a pair of dual, casterable wheels.

Referring to Figures 1–4 showing an aircraft undercarriage with which the present invention may be used, the strut 10 is bifurcated at its upper extremity 12 for attachment to the underside of an aircraft. At the lower extremity of strut 10 is carried an axle 14 which supports a pair of dual wheels 16 and 18. Both wheels are mounted for castering action at the opposite ends of the axle on centrally disposed pivots or king pins 20 which are disposed midway between the lateral wheel sides 21 and 23 (Figure 4). As viewed in Figure 2, the axis of the king pin 20, represented by line 20', is inclined at an angle with respect to the vertical. Forward motion of the wheels is indicated by the direction of arrow F. With the king pin axis so inclined and located midway between the wheel sides, the forces tending to swivel or pivot the wheel about the king pin are balanced thereby providing a true trailing or castering wheel which is free to pivot about its castering axis.

Carried on axle 14 by a pair of brackets 22 is the steering device for the wheels 16, 18. On top of the steering device, as best shown in Figure 3, is an operator-operated control valve 26 and a shimmy dampening device 28. The connection of steering device 24 to wheels 16 and 18 is best shown in Figure 4 where, in present embodiment, each wheel includes a cast or forged central hub portion 30 on which is mounted a single large diameter bearing 32. An outer rim portion 34, supported on bearing 32, comprises the rotating part of the wheel. King pins 20 are carried at opposite ends of axle 14 and are disposed within companion sockets 44 formed in hub portions 30. Parallel to king pins 20 and radially outwardly offset therefrom are pivot pins 45 and 46, also carried on hub portions 30. A pair of linkages 48 and 50, which form part of the steering device, are carried by the pivot pins. The pivot-engaging ends of the linkages comprise a pair of clevises 52 and 54 which threadedly engage the main stem of their associated linkages. Note that with this arrangement, the length of the linkages can be adjusted to take care of assembly tolerances between the wheels. Lock nuts 56 and 58 serve to lock clevises 52 and 54 to their associated linkages.

Figure 5:
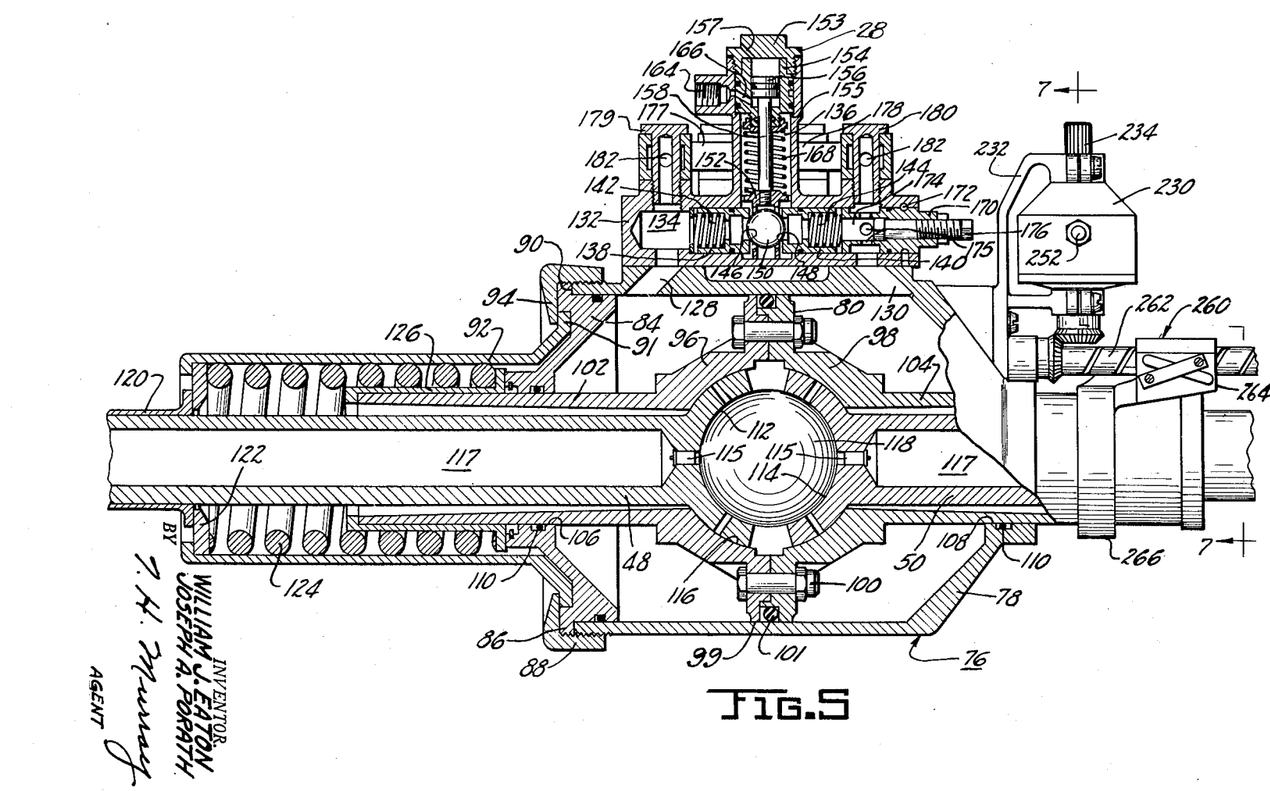
Figure 5 is an axial cross section of the invention taken along line 5—5 of Figure 3.

Referring to Figures 4 and 5, the combination steering and shimmy dampening system includes a double-acting fluid motor 76 having a closed cylinder housing 78 and a piston member 80 reciprocable therein. A removable end cap 84, having a radially outwardly extending flange 86, is inserted into the left end of the cylinder housing to facilitate removal of the piston member from within the fluid motor. Annular packing nut 88, threadedly engaging cylinder housing 78 serves to hold flange 86 of end cap 84 securely against a shoulder 90 formed in one end of the housing. A cylindrical cover plate 92 is securely held against end cap 84 between a flange 94 formed on packing nut 88 and a flat annular surface 91 of the end cap.

Piston member 80 comprises a pair of allochiral, cup-shaped members 96 and 98 joined at their outer peripheries by a plurality of circumferentially spaced bolts 100. A surface 99 of the piston member is formed to slide on the inner peripheral surface of housing 78. This surface is equipped with a ring seal 101 to prevent fluid communication between the opposed chambers of the fluid motor. A pair of tubular extensions 102 and 104, which form an integral part of the cup-shaped members, extend through openings 106 and 108 disposed at opposite ends of cylinder housing 78. Ring seals 110 serve to insure a fluid tight seal between the interior of the cylinder housing and the atmosphere. Passing through extensions 102 and 104 are the linkages 48 and 50 provided with ends 112 and 114 which are carried within a spherical cavity 116 formed between the cup-shaped members 96 and 98. The ends 112 and 114 are also cup-shaped in form to abut the inner concave surfaces of members 96 and 98 respectively. A sphere 118, interposed between ends 112 and 114, serves to hold the ends securely against the said inner concave surfaces. The joints within cavity 116 may be lubricated by means of a pair of grease fittings 115 inserted into the ends of passages 117 which extend axially through linkages 48 and 50. The other end of each passage is internally threaded to receive clevis 52 or 54. Fastened between the left end of linkage 48 and lock nut 56 is a sleeve 120. Sleeve 120, in turn, holds a collar 122 against coil spring 124. At the opposite end of spring 124 is a second sleeve 126 which fits over extension 102 of cup-shaped member 96. Note that upon movement of the piston member to the right or left, spring 124 will be compressed, thereby tending to restore the piston member to its center position. Thus, when the wheels of the aircraft leave the ground, spring 124 will automatically center the piston member and wheels thereby facilitating retraction of the wheels into the space provided therefor in the aircraft fuselage and insuring alignment of the wheel with the axis of the aircraft when making a landing. However, as will become apparent from the following description, the wheels may be locked in their turned position if desired.

To steer the wheels, fluid pressure is admitted into the cylinder chamber through passages 128 and 130 which are formed in the cylinder housing wall. If, for example, fluid pressure is admitted through passage 130, piston member 80 and linkages 48 and 50 will be forced to the left, thereby pivoting wheels 16 and 18 about their respective king pins in a counterclockwise direction as shown in Figure 4. The movement of the piston to the left will exhaust fluid to the left of the piston member through passage 128. Lateral movement of the ends of the linkages because of arcuate motion of the pivots about their king pins is permitted by the ball-and-socket engagement of ends 112 and 114 with spherical cavity 116. Note that the piston and linkage construction shown provides a means whereby the pivotal centers of the linking elements can be made to coincide. That is, forces acting along the axis of the linking elements will intersect at the center of sphere 118 so that any resultant side thrust will be taken along a plane through the center of the piston member or through surface 99. If the pivotal centers of the linking elements were not coincident, and were axially spaced with respect to the piston member, forces acting along the axis of the linking elements would produce a moment about the center of the piston tending to twist and bind the piston in its axial line of travel. The present invention, therefore, eliminates any binding effect in the piston member by providing a single pivotal center for both linkages. This method of making the pivotal center of the linking elements coincident is especially adaptable to heavy aircraft which require large forces for steering dual wheels.

The shimmy dampening device 28, as shown in Figure 5 comprises a T-shaped body 132 through which extends a bore 134. A second bore 136 extends through the vertical section of the T-shaped body and intersects the midportion of bore 134. A pair of collars 138 and 140, slidably received within bore 134, are biased toward each other by a pair of coil springs 142 and 144. Annular valve seats 146 and 148 are formed in the opposing faces of the collars. A spherical valve element 150 is interposed between and seatable on valve seats 146 and 148. Surrounding valve element 150 is a slotted carriage 152 which is used to remove valve element 150 from between its associated valve seats. The upper portion of carriage 152 is slidably received in the lower portion of bore 136. Positioned in the upper portion of bore 136 is an inner cylinder 154 within which a piston 156 is received. End-cap 153, threaded into bore 136, serves to hold cylinder 154 against a shoulder 155. A small orifice 157 prevents a buildup of pressure above piston 156 upon its upward movement. Piston rod 158, threadedly engaging carriage 152, serves to link the piston and carriage whereby upward motion of the piston will cause valve element 150 to be removed from between its associated valve seats. In its removed position valve element 150 will force the collars outward against the action of their associated springs thereby allowing communication between passages 128 and 130 through bore 134. To move the piston and carriage upward, a source of fluid pressure is selectively applied to the lower surface of piston 156 through port 164, and passage 166. Coil spring 168, interposed between cylinder 154 and carriage 152, will return valve element 150 to its position between valve seats 146 and 148 upon release of fluid pressure applied to piston 156. Inserted into the right end of bore 134 is a plugging member 170 held in place by a series of balls inserted into a race 172 disposed between member 170 and body 132. Transversely extending through the center of plugging member 170 is a passage 174, one end of which is formed to threadedly receive a needle valve 176. Communication is established between bore 134 and passage 130 by means of a series of holes 175 circumferentially spaced in plugging member 170. By adjusting needle valve 176, holes 175 can be partially covered thereby restricting flow through bore 134. A pair of conduits 177 and 178 (best shown in Figure 3) serve to join passages 128 and 130 to the working ports of control valve 26. Tubular bolting members 179 and 180, having holes 182 therein, establish communication between passages 128 and 130 and conduits 177 and 178 respectively.

Figure 6:
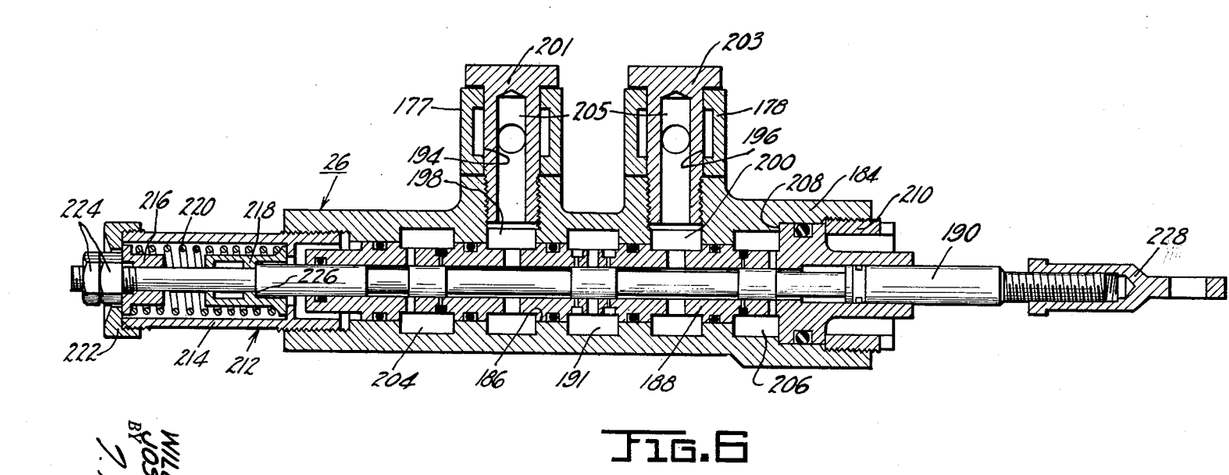
Figure 6 is a cross section of the control valve of the invention taken along line 6—6 of Figure 3.

As seen in Figure 6, the operator-operated control valve 26 is of the slide valve type having a body 184 through which extends a bore 186. An inner cylinder member 188, carried within bore 186, is formed to slidably receive valve element 190. Five axially spaced annuli are formed between body 184 and inner cylinder member 188. Annulus 191 communicates with an inlet port 192 (shown in Figure 3); working ports or passages 194 and 196 are connected to annuli 198 and 200 respectively; and annuli 204 and 206 are connected to a return port 202 (shown in Figure 3). A second pair of tubular bolting members 201 and 203, having holes 205 therein, communicate the working passages with conduits 177 and 178. A source of fluid pressure from reservoir 207 and pump 209 is connected through high and low pressure lines to the inlet and return ports respectively.

The valve element 190 comprises a rod having a series of reduced diameter portions which permit communication between the various ports of the valve upon movement of the valve element to the left or right. Inner cylinder member 188 is held in place between shoulder 208 formed in body 184 and a ring nut 210 which threadedly engages the right end of bore 186. A spring mechanism 212 serves to return the valve element to its neutral position (shown in Figure 6) in which communication is blocked between the various ports of the valve. The spring mechanism comprises an outer housing 214 threaded into body 184, a pair of collars 216 and 218 between which a coil spring 220 is interposed, and an end cap 222 which compresses spring 220 between its associated collars. A pair of lock nuts 224 serve to hold valve element 190 against shoulder 226 formed in collar 218 to thereby prevent uncontrolled axial movement of the valve element. Movement of the valve element to the right will establish communication between inlet port 192 and working port 194 through annuli 191 and 198, and between return port 202 and working port 196 through annuli 200 and 206 thereby allowing fluid pressure in conduit 178 to force piston member 80 and linkages 48 and 50 to the left as shown in Figure 4.

Movement of the valve element to the left will likewise cause the piston member and its associated linkages to the right. Thus, by moving the valve element to the right or left, wheels 16 and 18 will be forced to pivot about their respective king pins. It is to be understood that the invention is not limited to the valve shown in the present embodiment and that any suitable valve may be used in its place.

Figure 7:
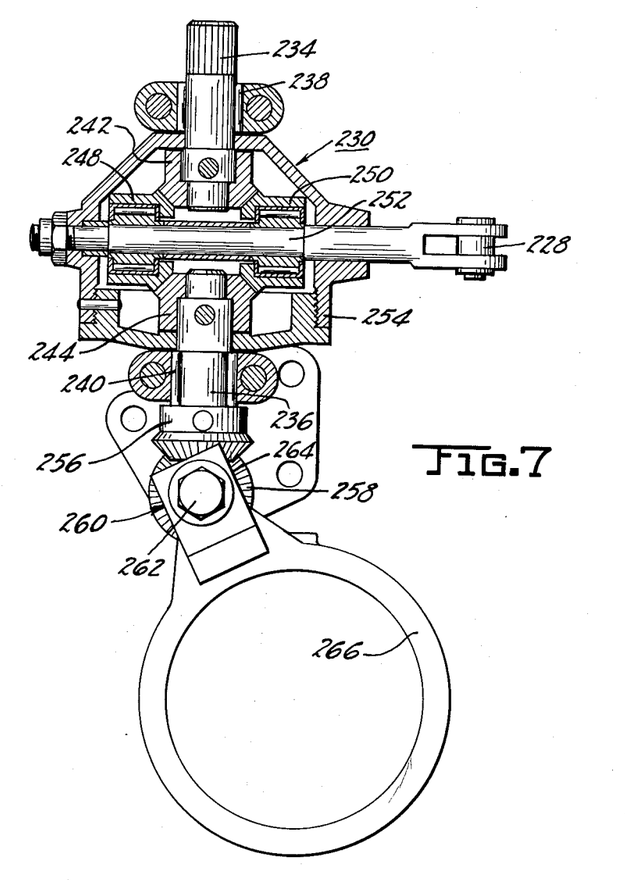
Figure 7 is a cross section of the follow up control mechanism of the invention taken along line 7—7 of Figure 5.

On the right end of valve element 190 (Figure 6) is threaded a clevis 228 which is connected to the follow-up control system shown in Figures 5 and 7. This system utilizes a conventional differential gear box 230 which is carried on the side of fluid motor 76 by a bracket assembly 232. Extending from the top and bottom of the gear box are a pair of shafts 234 and 236 which are rotatable on anti-friction bearings 238 and 240, both of which are carried by bracket assembly 232. Fastened to shafts 234 and 236 are a pair of driver gears 242 and 244 which mesh with pinion gears 248 and 250. The pinion gears are free to rotate on a shaft 252 which extends transversely across the center of the gear box. At this point it can be seen that any differential rotation between shafts 234 and 236 will cause shaft 252 and casing 254 to rotate about the axes of shafts 234 and 236.

Shaft 234 is connected by any suitable linkage to the control lever in the cockpit of the aircraft; shaft 252 is connected to clevis 228 of control valve 26; and shaft 236 is connected through bevel gears 256 and 258 to an anti-friction mechanism 260. This mechanism comprises a rotating shaft 262 which has a spiral race formed therein to be engaged by a plurality of ball bearings carried in a companion race formed on the interior of nut member 264. Member 264 is, in turn, carried on extension 104 by clamp 266. Any movement of piston member 80 to the right or left will likewise force member 264 to move a corresponding distance. The reciprocating movement of member 264 will be transformed into rotational motion through shaft 262 to thereby rotate lower shaft 236 in the gear box.

Operation of the device is as follows: Assuming that valve element 150 is seated on its associated valve seats, if the pilot in the control cockpit rotates shaft 234 clockwise as viewed from the top, casing 254 and shaft 252 will rotate clockwise also since wheels 16 and 18 and shaft 240 are now held stationary. This action will force valve element 190 to the right as shown in Figures 5 and 6 to thereby allow fluid pressure in conduit 178 to force piston 80 to the left. The corresponding movement of member 264 will cause shaft 236 to rotate counter-clockwise to thereby force valve element 190 to the left and return it to its closed position. Thus, for a predetermined increment of movement in the pilot-operated control lever, control valve 26 will be opened until the wheels are turned to a certain angle represented by the increment of movement of the control lever. At this point the valve will be automatically closed by the reversing action of the differential gear box. In other words, after an initial setting of the control lever to turn the wheels to a certain predetermined angle with respect to the longitudinal axis of the aircraft, there is no subsequent movement of the control lever necessary to arrest the movement of the wheels after they reach the aforesaid predetermined angle. It is to be understood that the use of the follow-up control system is optional and that control valve 26 may be operated by direct actuation of valve element 190 if desired.

After the wheels are turned to any desired angle, they will be locked in that position until they are turned in the opposite direction or until valve element 150 in the shimmy dampening device 28 is removed from between its associated valve seats. That is, after the wheels are turned to a certain angle, valve element 190 will be returned to its neutral position to thereby block communication between the opposite fluid chambers on each side of piston member 80. Thus, if the pilot of the aircraft desires, he may lock the wheels at an angle which places the wheels in alignment with the landing strip before the aircraft alights on the ground.

Most landings, however, will be made with the wheels free to caster about their respective pivots so that they can automatically adjust themselves to take the forward thrust of the aircraft regardless of the angle at which the aircraft approaches the landing strip. To incorporate free castering into the system, the pilot will open a valve, not shown, to apply fluid pressure through port 164 to the bottom of piston 156 in the shimmy dampening device. Valve element 150 will, therefore, be pulled from between its associated valve seats to allow communication between the opposite sides of cylinder chamber 78. After wheels 16 and 18 strike the ground and begin to shimmy, piston member 80 will reciprocate rapidly within cylinder chamber 78 thereby causing a back-and-forth rush of fluid through bore 134. Restricted passages 175 check the resulting rush of fluid, thus stopping the shimmy before the vibration becomes serious. After the aircraft is safely on the ground, fluid pressure can be released from piston 156 so that spring 168 will force valve element 150 between its associated valve seats. The steering feature of the assembly can now be used to manipulate the aircraft while on the ground.

Although only one embodiment of the invention has been illustrated and described, various changes in the form and relative arrangement of the parts may be made to suit requirements without departing from the spirit and scope of this invention.

Having thus described our invention, what we claim as new and desire to secure by Letters Patent is:

1. In a steering system for dual castered wheels of the type having a substantially vertical king pin at the center of each wheel, the combination of an operator-operated control valve, a source of fluid pressure connected through high and low pressure lines to said control valve, a double-acting fluid motor carried between the castered wheels for steering the same and comprising a closed cylinder housing together with a piston member reciprocable within the housing, said piston member comprising a pair of cup-shaped members joined at their outer peripheries to form a substantially spherical chamber therebetween, a pair of tubular extensions integral with said cup-shaped members and extending through opposite ends of said cylinder housing, a pair of linking elements extending through said tubular extensions for joining the piston member with the dual wheels, each of said linking elements engaging said piston member and one of the respective wheels, the wheel-engaging ends of the linking elements being pivoted on an axis parallel to said king pin and radially outwardly offset therefrom, the piston-engaging ends of the linking elements being carried within the spherical chamber formed between said cup-shaped members, said latter-mentioned ends forming the general shape of hollow semi-spheres, a spherical member interposed between said latter-mentioned ends to hold the same in abutting relationship with the inner concave surfaces of said cup-shaped members, a pair of conduits connecting the control valve with the opposite ends of said double-acting fluid motor, a restricted passage connecting said conduits and a two-way valve mechanism for controlling communication between said conduits through said passage.

2. In a steering system for dual castered wheels of the type having a substantially vertical king pin at the center of each wheel, the combination of an operator-operated control valve, a source of fluid pressure connected through high and low pressure lines to said control valve, a double-acting fluid motor carried between the castered wheels for steering the same and comprising a closed cylinder housing together with a piston member reciprocable within the housing, said piston member comprising a pair of cup-shaped members joined at their outer peripheries to form a substantially spherical chamber therebetween, a pair of tubular extensions integral with said cup-shaped members and extending through opposite ends of said cylinder housing, a pair of linking elements extending through said tubular extensions for joining the piston member with the dual wheels, the wheel-engaging ends of the linking elements being pivoted on an axis parallel to said king pin and radially outwardly offset therefrom, the piston-engaging ends of the linking elements being carried within the spherical chamber formed between said cup-shaped members, said latter-mentioned ends forming the general shape of hollow semi-spheres, a sphere member interposed between said latter-mentioned ends to hold the same in abutting relationship with the inner concave surfaces of said cup-shaped members, and a pair of conduits connecting the control valve to opposite ends of said fluid motor.

3. In a steering system for dual castered wheels of the type having a substantially vertical king pin at the center of each wheel, the combination of an operator-operated control valve, a source of fluid pressure connected through high and low pressure lines to said control valve, a double-acting fluid motor carried between the castered wheels for steering the same, said fluid motor comprising a closed cylinder housing and a piston member reciprocable therein, said piston member being formed with a centrally disposed cavity and two integral axially extending tubular members passing through opposite ends of the piston chamber, the interior of said tubular members communicating with said piston cavity, a pair of linkages extending through the tubular members for connecting the piston member to said dual wheels, the wheel-engaging ends of the linkages being pivoted on an axis parallel to said king pin and radially outwardly offset therefrom, the piston-engaging ends of the linkages being carried within said piston cavity, means for permitting swivelling action of the linkages about their piston-engaging ends, a pair of conduits connecting the control valve to opposite ends of the fluid motor, and valve means connected to said conduits, said valve means having a closed position and an open position which allows communication between said conduits through a restricted passage, said restricted passage being such as to oppose sudden pressure changes in the opposite chambers of said double-acting fluid motor due to rapid movement of said piston member.

4. In a steering system for dual castered wheels of the type having a substantially vertical king pin at the center of each wheel, the combination of an operator-operated control valve, a source of fluid pressure connected through high and low pressure lines to said control valve, a double-acting fluid motor carried between the castered wheels for steering the same, a pair of conduits connecting the control valve to opposite ends of the fluid motor, said fluid motor comprising a cylinder housing and a piston member reciprocable therein, said piston member having a centrally disposed cavity therein and two integral axially extending tubular members passing through opposite ends of the piston chamber, the interior of said tubular members communicating with said piston cavity, a pair of linkages extending through the tubular members for connecting the piston member to said dual wheels, the wheel-engaging ends of the linkages being pivoted on an axis parallel to said king pin and radially outwardly offset therefrom, the piston-engaging ends of the linkages being carried within said piston cavity, and means for permitting swivelling action of the linkages about their piston-engaging ends.

5. In a steering system for dual castered wheels of the type having a substantially vertical king pin at the center of each wheel, the combination of an operator-operated control valve, a source of fluid pressure connected through high and low pressure lines to said control valve, a double-acting fluid motor carried between the castered wheels for steering the same, said fluid motor comprising a cylinder housing and a double-acting piston reciprocable within the housing, a pair of linking elements connecting the piston with said dual wheels so that upon movement of the piston the wheels are forced to pivot about their respective king pins, engagement between the piston and linking elements being in the form of a ball-and-socket joint thereby permitting swivelling motion of the linking elements, a pair of conduits connecting the control valve to opposite ends of the fluid motor, and valve means connecting said pair of conduits, said valve means having an open position and a closed position, the open position of the valve permitting communication between said conduits through a restricted passage.

6. In a steering system for dual castered wheels of the type having a substantially vertical king pin at the center of each wheel, the combination of an operator-operated control valve, a source of fluid pressure connected through high and low pressure lines to said control valve, a double-acting fluid motor carried between the castered wheels for steering the same, said fluid motor comprising a cylinder housing and a double-acting piston reciprocable within the housing, a pair of linking elements connecting the piston with said dual wheels so that upon movement of the piston the wheels are forced to pivot about their respective king pins, engagement between the piston and linking elements being in the form of a ball-and-socket joint thereby permitting swivelling motion of the linking elements, and a pair of conduits connecting the control valve to opposite ends of said fluid motor.

7. A double-acting fluid motor for use in steering dual castered wheels comprising a closed cylinder housing disposed between said wheels, a piston member reciprocable within said housing, said piston member comprising a pair of cup-shaped elements joined at their outer peripheries to form a substantially spherical chamber therebetween, said cup-shaped elements having axially outwardly extending tubular extensions projecting through the opposite ends of said cylinder chamber, a pair of linking elements extending through the tubular extensions for joining the piston member with the wheels, each of said linking elements being connected to its associated wheel by a pivot so located on the wheel that reciprocating movement of the linking elements will rotate the wheel about its pivot, the piston-engaging ends of the linking elements comprising substantially hollow, cup-shaped semi-spheres which face each other within said spherical chamber, and a sphere carried between the inner concave surfaces of the cup-shaped semi-spheres to force the same against the inner surface of said spherical chamber thereby permitting swivelling motion of the linking elements about a center which coincides with the center of the sphere interposed between said cup-shaped semi-spheres.

8. A double-acting fluid motor for use in steering a pair of aircraft landing wheels comprising a closed cylinder housing, a piston member reciprocable within said housing, said piston member comprising a pair of allochiral cup-shaped elements joined at their outer peripheries to form a substantially spherical chamber therebetween, said elements having axially outwardly extending tubular extensions projecting through the opposite ends of said cylinder chamber, a pair of piston rods extending through said tubular extensions and each piston rod adapted to be connected to one wheel of said pair, one end of each of said piston rods being carried within said spherical chamber, said one end being in the form of a hollow, cup-shaped semi-sphere, and a ball member carried between the inner concave surfaces of said cup-shaped semi-spheres to maintain the same in bearing contact against the inner surface of said spherical chamber thereby permitting universal swivelling motion of said piston rods about a center which coincides with the center of said spherical member.

9. In a steering system for dual castered wheels of the type having a substantially vertical king pin at the center of each wheel, the combination of an operator-operated control valve, a source of fluid pressure connected through high and low pressure lines to said control valve, a double-acting fluid motor carried between the castered wheels for steering the same, a pair of conduits connecting the control valve to opposite ends of the fluid motor, and valve means connecting said conduits, said valve means comprising a body having a first bore extending therethrough, the ends of said bore acting as the ports of the valve for connection with said conduits, a second bore in the body perpendicular to said first bore and communicating therewith, a pair of reciprocable, cylindrical collars positioned within the first bore, a pair of springs urging said collars into contact with each other, annular valve seats formed in the opposing faces of said collars, a spherical valve element interposed between and seatable on said valve seats, and means for positioning the valve element with respect to its associated valve seats, said last-mentioned means comprising a carriage for the valve element, a single-acting fluid motor carried within said second bore and connected to said carriage whereby the valve element will be removed from between its associated valve seats upon actuation of the motor, the removed position of the valve element being such as to permit communication between said conduits, a restricted passage in said first bore, and means for returning the valve element to its position between the valve seats upon release of fluid pressure applied to said single-acting fluid motor.

10. In a steering system for a castered wheel of the type having a substantially vertical king pin at the center thereof, the combination of an operator-operated control valve, a source of fluid pressure connected through high and low pressure lines to said control valve, a double-acting fluid motor for steering said wheel, a pair of conduits connecting the control valve to opposite ends of the fluid motor, and valve means connecting said conduits, said valve means including inlet and outlet ports, a pair of slidable elements interposed between the inlet and outlet ports, a passageway through each of said elements to facilitate communication between said ports, a valve seat formed in the passageway of each element, means urging said valve seats toward each other, a valve element interposed between and selectively seatable on said valve seats, and means defining a restricted passage through which fluid must pass in traveling between said ports, said passage being such as to counteract rapid fluctuations in cylinder chamber pressure when said valve element is not seated on its associated valve seats.

11. In a steering system for a castered wheel of the type having a substantially vertical king pin at the center thereof, the combination of an operator-operated control valve, a source of fluid pressure connected through high and low pressure lines to said control valve, a double-acting fluid motor for steering said wheel, a pair of conduits connecting the control valve to opposite ends of the fluid motor, and valve means connecting said conduits, said valve means comprising inlet and outlet ports, a pair of slidable elements interposed between the inlet and outlet ports, a passageway through each of said elements to facilitate communication between said ports, a valve seat formed in the passageway of each element, means urging said valve seats toward each other, a valve element interposed between and seatable on said valve seats, and means for removing said valve element from between its associated valve seats to thereby establish communication between the inlet and outlet ports.

12. In a steering system for a castered wheel of the type having a substantially vertical king pin at the center thereof, the combination of an operator-operated control valve, a source of fluid pressure connected through high and low pressure lines to said control valve, a double-acting fluid motor for steering said wheel, a pair of conduits connecting the control valve to opposite ends of the fluid motor, and valve means connecting said conduits, said valve means including inlet and outlet ports, a passageway connecting the inlet and outlet ports, means in said passageway defining a restriction through which fluid must pass in traveling between said ports, a pair of valve seats formed in the passageway, and a valve element interposed between and seatable on the valve seats for controlling communication between said ports.

13. In a steering system for a castered wheel of the type having a substantially vertical king pin at the center thereof, the combination of an operator-operated control valve, a source of fluid pressure connected through high and low pressure lines to said control valve, a double-acting fluid motor for steering the castered wheel, a pair of conduits connecting the control valve to opposite ends of the fluid motor, and valve means connecting said conduits, said valve means including inlet and outlet ports, a restricted passageway connecting the inlet and outlet ports, a pair of valve seats in the passageway, and a valve element interposed between and seatable on the valve seats for controlling communication between said ports.

14. For use with a castered wheel of the type having a substantially vertical king pin at the center thereof, a combination steering and shimmy dampening system for the wheel comprising a closed cylinder housing, a piston member reciprocable within the housing, a linking element connecting the castered wheel with the piston member whereby movement of the piston will rotate the wheel about its king pin, an operator-operated control valve having inlet, return, and two working ports, said control valve having a neutral position in which communication is blocked between said ports, a pair of conduits connecting said working ports to the opposite ends of said cylinder housing, and two-way valve means connected to the opposite ends of said cylinder housing, said valve means having a closed position for preventing communication between the opposite ends of the cylinder housing and an open position permitting restricted communication between said opposite ends while the control valve is in its said neutral position, said restricted comfunication being such as to counteract rapid fluctuations in cylinder chamber pressure due to uncontrolled high frequency oscillations on the part of the piston member.

15. For use with a castered wheel of the type having a substantially vertical king pin at the center thereof, a combination steering and shimmy dampening system for the wheel comprising a double-acting fluid motor, a linkage connecting said fluid motor and wheel in such a manner that actuation of the fluid motor will rotate the wheel about its king pin, a control valve for the fluid motor, a pair of conduits connecting the fluid motor to the control valve, said control valve having a closed position blocking communication between said conduits, and a valve mechanism connected to said conduits, said valve mechanism having a closed position and an open position which permits communication between the conduits through a restricted passage when the control valve is in its closed position, said passage being such as to counteract or restrict rapid changes in pressure in said conduits.

16. A combination steering and shimmy dampening system for use with a castered wheel comprising a double-acting fluid motor for steering the wheel, said fluid motor including a closed cylinder housing and a piston reciprocable therein dividing the housing into opposed chambers, an operator-operated control valve for the fluid motor having inlet, return, and two working ports, a source of fluid pressure connected through high and low pressure lines to the inlet and return ports respectively, said valve having a neutral position in which communication is blocked between said ports, a pair of conduits connecting the working ports to said opposed chambers, and valve means responsive to the fluid pressure developed in steering the wheel, said valve means having a closed piston and an open position allowing communication between the opposed chambers of the cylinder housing through a restricted passage rendered effective on the opening of said valve, said passage being such as to counteract rapid pulsations of pressure within the opposed chambers due to uncontrolled high frequency oscillations of the piston member caused by the castered wheel.

17. A valve device comprising a body having inlet and outlet ports, a first bore in the body connecting said ports, a second bore in the body perpendicular to said first bore and communicating therewith, a pair of annular collars slidably positioned within said first bore, annular valve seats formed in the ends of the collars which face each other, means urging said ends toward each other, a valve element interposed between and seatable on said valve seats, and means for removing the valve element from its position between the valve seats to a position allowing communication between said ports, said last-mentioned means including a carriage for the valve element, a fluid motor connected to said carriage, said fluid motor comprising a piston reciprocable within said second bore, a source of fluid pressure for actuating the piston, and resilient means carried within said second bore for returning the valve element from its position allowing restricted communication between the ports to its seated position upon release of fluid pressure applied to said piston.

18. A double acting fluid motor comprising a closed cylinder housing, a hollow piston member reciprocable therein, tubular extensions on said hollow piston member extending thru the opposite ends of said closed cylinder housing, a piston rod member extending loosely through each of said extensions to the interior of said hollow piston member, and means universally connecting said piston rods to said hollow piston member, whereby said piston rods are arranged to move in more than one plane about said universal connection.

References Cited in the file of this patent

UNITED STATES PATENTS

| | | |
|---|---|---|
| 1,788,566 | Dock | Jan. 13, 1931 |
| 2,030,458 | McKellar | Feb. 11, 1936 |
| 2,061,120 | Vorech | Nov. 17, 1936 |
| 2,621,002 | Pittman | Dec. 9, 1952 |
| 2,638,124 | Nickerson | May 12, 1953 |
| 2,657,883 | Kupiec | Nov. 3, 1953 |

FOREIGN PATENTS

| | | |
|---|---|---|
| 542,648 | Great Britain | Jan. 21, 1942 |